United States Patent
Dinsdale et al.

(10) Patent No.: US 6,854,763 B2
(45) Date of Patent: Feb. 15, 2005

(54) BIAXIAL FLOW INFLATOR WITH INDEPENDENTLY ADJUSTED GAS ORIFICES

(75) Inventors: Paul Dinsdale, Farr West, UT (US); David J. Green, Brigham City, UT (US); Karl K. Rink, Princeton, ID (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/115,857

(22) Filed: Jun. 6, 2002

(65) Prior Publication Data

US 2003/0227160 A1 Dec. 11, 2003

(51) Int. Cl.$^7$ ................................................. B60R 21/26
(52) U.S. Cl. ................................. 280/737; 280/730.2
(58) Field of Search .............................. 280/737, 736, 280/741, 742, 728.2, 730.2, 729

(56) References Cited

U.S. PATENT DOCUMENTS

| | | |
|---|---|---|
| 3,877,882 A | 4/1975 | Lette et al. |
| 3,961,806 A | 6/1976 | Katter |
| 4,796,912 A | 1/1989 | Lauritzen et al. |
| 4,919,897 A | 4/1990 | Bender et al. |
| 5,058,921 A | 10/1991 | Cuevas |
| 5,225,940 A | 7/1993 | Ishii et al. .................... 359/823 |
| 5,273,309 A | 12/1993 | Lau et al. |
| 5,301,979 A | 4/1994 | Allard |
| 5,593,180 A | 1/1997 | Cuevas et al. ............... 280/741 |
| 5,630,619 A | 5/1997 | Buchanan et al. ........... 280/741 |
| 5,660,412 A | 8/1997 | Renfroe et al. |
| 5,709,406 A | 1/1998 | Buchanan .................... 280/737 |
| 5,762,369 A | 6/1998 | Mooney et al. .............. 280/741 |
| 5,779,269 A | 7/1998 | Moore et al. |
| 5,794,973 A | 8/1998 | O'Loughling et al. |
| 5,820,161 A | 10/1998 | Svensson .................... 280/737 |
| 5,863,066 A | 1/1999 | Blumenthal |
| 5,951,043 A | 9/1999 | Mooney et al. .............. 280/741 |
| 5,992,881 A | 11/1999 | Faigle |
| 6,010,152 A * | 1/2000 | Swann et al. ................ 280/736 |
| 6,056,319 A | 5/2000 | Ruckdeschel et al. |
| 6,062,599 A * | 5/2000 | Forbes et al. ................ 280/737 |
| 6,073,961 A * | 6/2000 | Bailey et al. ............. 280/730.2 |
| 6,086,094 A | 7/2000 | Stevens et al. |
| 6,095,561 A | 8/2000 | Siddiqui et al. |
| 6,206,412 B1 | 3/2001 | Swann et al. |
| 6,254,124 B1 | 7/2001 | Angermaier |
| 6,293,581 B1 * | 9/2001 | Saita et al. ............... 280/730.2 |
| 6,390,499 B1 * | 5/2002 | Leitner et al. ............... 280/736 |
| 6,390,502 B1 | 5/2002 | Ryan et al. |
| 6,557,902 B1 * | 5/2003 | Waimer et al. .............. 280/741 |
| 6,572,141 B2 | 6/2003 | Nanbu |
| 2001/0038199 A1 * | 11/2001 | Fischer ..................... 280/730.2 |
| 2001/0048218 A1 * | 12/2001 | Whang et al. ............... 280/737 |
| 2003/0042719 A1 | 3/2003 | Rink et al. |

FOREIGN PATENT DOCUMENTS

| | | | |
|---|---|---|---|
| DE | 19701663 | 7/1998 | .......... B60R/21/26 |
| DE | 199 30 239 | 1/2001 | |
| DE | 100 40 822 | 4/2001 | |
| DE | 101 38 245 | 5/2002 | |
| EP | 0 949 126 | 10/1999 | |
| JP | 2000-296751 | 10/2000 | .......... B60R/21/22 |
| WO | WO99/32334 | 7/1999 | .......... B60R/21/26 |

* cited by examiner

*Primary Examiner*—Peter C. English
(74) *Attorney, Agent, or Firm*—Sally J. Brown (57) ABSTRACT

An airbag or inflatable curtain inflator for producing two differing gas flows is disposed. The inflator has a gas chamber, a first orifice, and a second orifice. The first orifice has a different effective cross-sectional area than the second orifice. The two different cross-sectional areas allow the first orifice to produce a mass flow rate of gas that is different from the second orifice. The mass flow rates of gas may be related to the volume of an inflatable curtain into which the gas is ejected. Thus, two differently sized volumes of an inflatable curtain may be simultaneously inflated with a single inflator.

30 Claims, 9 Drawing Sheets

BIAXIAL FLOW INFLATOR WITH INDEPENDENTLY ADJUSTED GAS ORIFICES

BACKGROUND OF THE INVENTION

1. Field of the Invention

The present invention relates to a dual flow inflator for injecting multiple gas flows of gas into an automobile airbag system. More specifically, the present invention relates to a dual flow injector structured to provide independently adjusted gas flows to selected portions of an inflatable airbag system, such as an inflatable curtain.

2. Description of Related Art

The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the expulsion of rapidly expanding gases from an inflator. The expanding gases fill the airbags, which immediately inflate in front of the driver and passenger to protect them from impact against the windshield. Side impact airbags, known as inflatable curtains, have also been developed in response to the need for protection from impacts in a lateral direction, or against the side of the vehicle. An inflatable curtain may have one or more separately inflated inflatable curtains.

Side impact inflatable curtains are often designed to unfold or unroll downward to inflate beside a person to keep the person from hitting the door or window during lateral impact. Since a vehicle occupant may be leaning forward, reclined in the seat, or at any position between, such inflatable curtains are often made somewhat long to ensure that the occupant hits the inflatable curtain. If multiple inflatable curtains are fed by a single inflator positioned either fore or aft of the inflatable curtains, an especially long gas flow path exists between the inflator and the inflatable curtain furthest from the inflator. Thus, the outermost extents of the inflatable curtain may receive insufficient inflation gas pressure to inflate to the optimal protective pressure.

Even with somewhat shorter inflatable curtains, even and rapid inflation can be difficult to achieve with known inflator designs. Many existing inflators eject inflation gases outward radially; consequently, the inflation gases are not propelled along the length of the inflatable curtain, but are directed into the inflatable curtain near the inflator. The outer regions of the inflatable curtain are still inflated later than those closest to the inflator.

The problem of uneven gas distribution creates further design problems in the advanced and intelligent air bag deployment systems. Current automobile safety trends are leaning towards implementing multiple inflatable curtains along the sides of an automobile. These curtain airbag placement requirements may require varying sized and positioned inflatable curtains. Unfortunately, this presents the problem of simultaneously inflating two or more differently sized inflatable curtains at a single instant.

For example, inflatable curtain placement in a minivan may require two generally short inflatable curtains for the first two rows of seats and a third generally long inflatable curtain for the third row. The inflation of these differently sized inflatable curtains may require multiple inflators for each individual inflatable curtain. However, each inflator adds significant cost to the overall price of the automobile, causing some automobile manufacturers to decide against multiple side impact inflatable curtains.

While current innovations are addressing the problem of simultaneously inflating two similarly sized inflatable curtains, no technology is presently commercially available to inflate two differently sized inflatable curtains with a single inflator. Thus, present inflatable curtain systems are not capable of providing the controllability that may be obtained from an inflator having two independently controlled flows of gas.

Therefore, what is needed is an inflatable curtain inflator capable of simultaneously inflating two or more differently sized inflatable curtains. There is also a need for an inexpensive inflator capable of inflating multiple inflatable curtains. In that regard, there is a need for an inflator capable of inflating multiple inflatable curtains using a single initiator. It would be an advancement in the art to include these factors in a general small and thin inflatable curtain capable of being located along a roof rail. It would also be an advancement in the art to provide an inflator capable of producing two different mass flows of gas from a single inflator, such that a curtain system is capable of inflating two inflatable curtains with different internal gas pressures. It would be a further advancement to provide an inflator system that can be easily adjusted to inflate a wide range of inflatable curtain sizes. Such an inflator and system is described and claimed herein.

SUMMARY OF THE INVENTION

The apparatus of the present invention has been developed in response to the present state of the art, and in particular, in response to the problems and needs in the art that have not yet been fully solved by currently available inflators. Thus, it is an overall objective of the present invention to provide an inflator and related systems and methods that provide rapid, even inflation with a minimum of manufacturing and installation cost.

To achieve the foregoing objective, and in accordance with the invention as embodied and broadly described herein in the preferred embodiment, a dual flow inflator is provided. According to one embodiment, the inflator may comprise a gas chamber coupled to a first ejection orifice and a second ejection orifice. The first orifice has a first effective cross-sectional area and is fluidly coupled to the gas chamber. The second orifice, similarly, has a second effective cross-sectional area and is fluidly coupled to the gas chamber, where the cross-sectional areas of the orifices are different.

When the inflator releases the inflator gases, the difference between the two effective cross-sectional areas creates two different mass flow rates exiting the inflator. The mass flow rate of a gas is a function of the size of the orifice from which the gas is ejected. By controlling the size of the orifice, an inflator with two orifices can eject gas at two different mass flow rates. Other mechanisms of controlling the mass flow rates may also be employed, such as placing obstructions in the orifice to limit the cross-sectional area or by diverting a flow of gas away from the inflatable curtain.

The gas chamber may also have a first retention orifice and a second retention orifice. The first and second retention orifices are configured to have an open state and a closed state. The closed state may be accomplished by placing burst disks or other sealing mechanisms in front of each of the retention orifices. The open state occurs when the burst disks are forced through the retention orifices to allow gas to exit the inflator. The retention orifices may also function similarly to the ejection orifices by controlling the mass flow rate of gas exiting the inflator. The effective cross-sectional area of each of the retention orifices can be adjusted such that the two retention orifices eject gas at different mass flow rates.

The first and second ejection orifices or the first and second retention orifices may be configured to provide flows of gas in substantially opposite directions. Such a configuration could be accomplished with a generally elongated inflator having openings at opposing ends of the inflator. When the inflator is placed in operation, the first ejection orifice or retention orifice ejects gas in a first direction, while the second ejection orifice or retention orifice ejects gas in a substantially opposite, second direction.

The two gas flows being ejected from the inflator in opposite directions also minimize the thrust that is produced by the inflator. However, because the different mass flow rates generate different magnitudes of thrust, the inflator may not be entirely thrust neutral. A thrust neutral configuration can be created along a single axis even with two gas flows of different mass flow rates simultaneously exiting the inflator. This may be accomplished by angling one of the ejection orifices ejecting a gas. By angling an ejection orifice, the thrust will be divided into longitudinal and transverse components. The angle of the ejection orifice can be defined so that the longitudinal component of the angled ejection orifice is substantially equal and opposite to a non-angled ejection orifice. Thus, the inflator may be thrust neutral in a single direction.

The use of two different gas flows having different mass flow rates from a single inflator allows for a large degree of control in deploying inflatable curtains. The different gas flows can be established to inflate two different sized volumes, such as two different sized sections in an inflatable curtain. The gas flow with the larger mass flow rate could inflate a larger volume and a smaller gas flow with a smaller mass flow rate could inflate a smaller volume. Alternatively, the two different gas flows can be employed to inflate two substantially different volumes at different times or at different pressures.

The invention may also be accomplished by coupling together two inflators each having gas flows of different mass flow rates. By coupling the inflators together, the module will function similarly to an inflator having two ejection orifices with two different gas flows. The inflator module may be substantially thrust neutral by orienting the ejection orifices in substantially opposite directions.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 10, is not intended to limit the scope of the invention, as claimed, but is merely representative of presently preferred embodiments of the invention.

The present invention provides an apparatus and method whereby problems associated with previously known inflators can be resolved. More specifically, through the use of independently adjustable orifices, a single inflator can be produced to provide varying streams of gas to two separate inflatable curtains. For example, two inflatable curtains having two different volumes may simultaneously inflate using a single inflator. Furthermore, the independently adjustable orifices can allow a single inflator to provide varying pressures within two separate inflatable curtains during a single initiation sequence.

Yet another application of an independently adjusted inflator is the ability to vary the inflator position within a single inflatable curtain. The inflator of the present invention may be placed at a position offset from a central location within an inflatable curtain. Thus, the individual orifices may be adjusted to eject two streams of gas into two different sections of the inflatable curtain, each gas stream having a different mass flow rate. Where a larger mass flow of gas may be ejected into the larger section of the inflatable curtain and a smaller mass flow of gas may be ejected into the smaller section of the inflatable curtain. The manner in which these principles are utilized in the present invention will be shown and described in greater detail in the following discussion.

Figure 1:
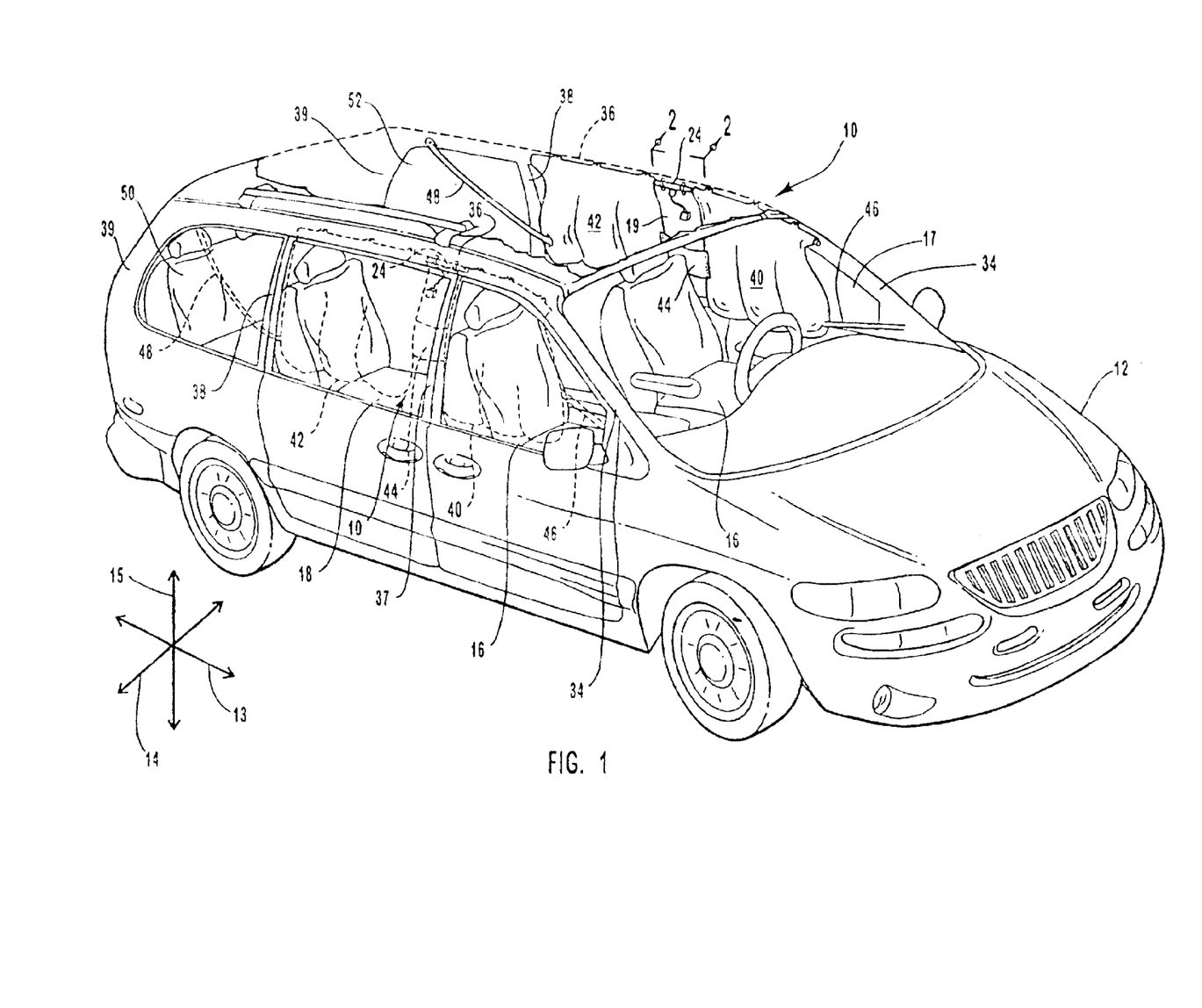
FIG. 1 is a perspective view of a vehicle with an inflatable curtain that incorporates one embodiment of an inflator according to the invention.

Referring to FIG. 1, an inflatable curtain 10 according to one embodiment of the invention is shown installed in a vehicle 12. The inflatable curtain 10 may form part of an airbag system configured to protect one or more vehicle occupants against lateral impact through the formation of a protective curtain beside the occupants.

The vehicle 12 has a longitudinal direction 13, a lateral direction 14, and a transverse direction 15. The vehicle 12 further has front seats 16 laterally displaced from first lateral surfaces 17, or front doors 17, as shown in the vehicle 12 of FIG. 1. The vehicle 12 also has rear seats 18 laterally displaced from second lateral surfaces 19, or rear doors 19, as depicted. As shown, two such inflatable curtains 10 may be used: one for the driver's side of the vehicle 12, and the other for the passenger's side. The two inflatable curtains 10 may or may not be the same volume or size.

The inflators 24 and the inflatable curtains 10 may be attached to roof rails 36 of the vehicle 12. Depending on the model of the vehicle 12 and the desired configuration of the inflatable curtains 10, airbag components may also be disposed along the B pillars 37, C pillars 38, and/or D pillars 39.

The inflatable curtains 10 shown in FIG. 1 are configured to protect not only occupants of the front seats 16, but those of the rear seats 18 as well. Thus, each inflatable curtain 10 may have a first volume 40 that is configured to inflate between the front seats 16 and one of the front doors 17, and a second volume 42 configured to inflate between the rear seats 18 and one of the rear doors 19. The first and second volumes 40, 42 of the inflatable curtain 10 may define protective zones within an automobile, where the protective zones are established to attenuate the motion of an automobile passenger.

The first and second volumes 40, 42 may be parts of the same inflatable curtain, i.e., the first and second volumes 40, 42 are in fluid communication with each other, even when gas is not able to flow through the inflator 24 between the first and second volumes 40, 42. However, the inflatable curtains 10 may optionally be adapted to have multiple inflatable curtains 10 that are isolated from each other.

Furthermore, the individual inflatable curtain volumes 40, 42 may have varying sizes and capacities according to the various automobile applications. The size and volume 40, 42 of the inflatable curtains 10 will be a function of the size of the protected zone in which they are located.

The first and second volumes 40, 42 of each inflatable curtain 10 may be attached together through the use of a connection zone 44 positioned between the volumes 40, 42. The connection zone 44 may provide a flow path through which gases can flow between the first and second volumes 40, 42.

Each of the inflatable curtains 10 may have a front tether 46 attached to the A pillar 34 and a rear tether 48 attached to the roof rail 36 to exert tension on the inflatable curtains 10 to keep them in place during inflation and impact. Those of skill in the art will recognize that the tethers 46, 48 may also be attached to other parts of the vehicle 12, such as the B pillars 37, C pillars 38, and/or D pillars 39. The tethers 46, 48 may be constructed of standard seatbelt webbing or the like.

Although each inflatable curtain 10 illustrated in FIG. 1 has two volumes 40, 42, the invention encompasses the use of inflatable curtains 10 with any number of inflatable curtain volumes 40, 42. Thus, if desired, each of the inflatable curtains 10 may be extended to have one or more protective zones positioned to protect occupants of extra seats 50 behind the rear seats 18 from impact against the third lateral surfaces 52 of the vehicle 12. Additional inflators 24 may be used to inflate such additional inflatable curtain volumes.

The inflators 24 may take the form of a hollow pressure vessel containing a gas generant, such as chemically reactive material and/or compressed gas. The inflator 24 can be activated and gas released upon application of electricity to an initiator which initiates an outflow of inflation gases from the inflator. In the exemplary configuration of FIG. 1, the inflators 24 are partially enveloped within the inflatable curtains 10 so that inflation gases exiting the inflators 24 flow directly into the inflatable curtains 10. The inflators 24 may operate with such rapidity that, before the vehicle 12 has fully reacted to the impact, the inflatable curtains 10 have inflated to protect vehicle occupants from impact.

The inflators 24 may be uniquely configured to provide even and rapid inflation, as well as simple and inexpensive manufacturing and installation. The configuration of the inflator 24 will be described in greater detail with reference to FIG. 2.

Figure 2:
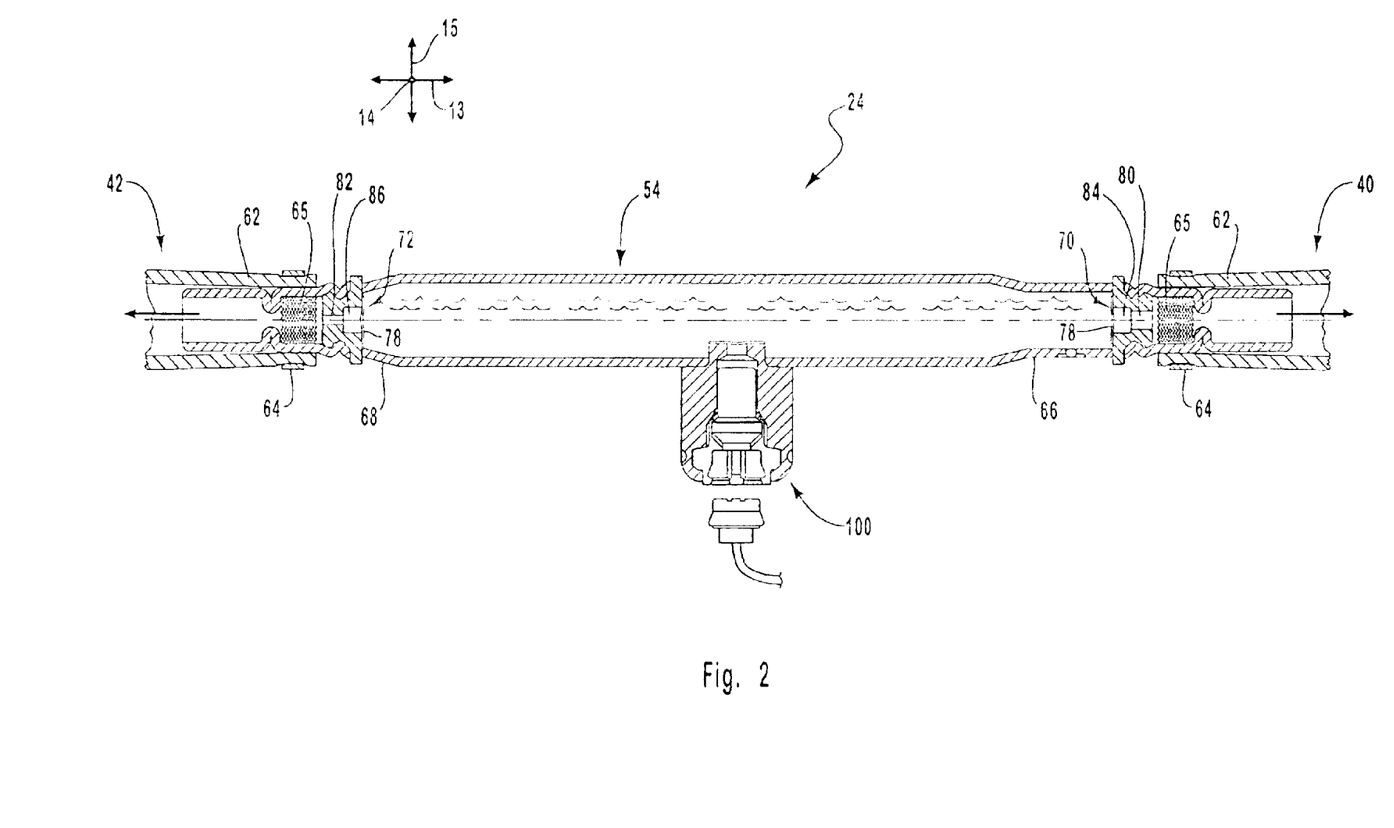
FIG. 2 is a cross-sectional view of an inflator having two different sized ejection orifices.

Referring to FIG. 2, a cross-sectional view of the inflator 24 is shown. The inflator 24 may have a gas chamber 54 formed of a material with a comparatively high tensile strength, such as steel. The gas chamber 54 may be formed of a single, unitary piece. In the alternative, the gas chamber 54 may be made from multiple pieces that are welded or otherwise attached together to provide the configuration shown in FIG. 2. The gas chamber 54 may have a generally tubular shape that includes flat, hemispherical, or otherwise dome-like caps.

The inflator 24 comprises a first orifice 70 and a second orifice 72. The first and second orifices 70, 72 provide a channel by which the gas within the gas chamber 54 may exit the inflator 24. In the inflator 24 illustrated in FIG. 2, the first orifice 70 and the second orifice 72 are both comprised of two sections: an ejection orifice 80, 82 and a retention orifice 84, 86.

The two different sections of the orifices 70, 72 are distinguished because of their individual functions. In some embodiments, the ejection orifices 80, 82 are separately sized and adjusted from the retention orifices 84, 86 depending upon the individual applications. Generally, the retention orifices 84, 86 provide a location to support the gas retention mechanisms, such as burst disks 78. In an inflator 24 having burst disks 78, the retention orifices 84, 86 would be opened once the burst disks 78 are forced through the orifices 70, 72. The retention orifices 84, 86 may be similarly sized, or may alternatively be different sizes depending upon the retention mechanisms.

The ejection orifices 80, 82 are generally positioned outward from the retention orifices 84, 86, such that gas ejecting from the gas chamber 54 will first pass through the retention orifices 84, 86 and then out the ejection orifices 80, 82. Because of the position of the ejection orifices 80, 82, the ejection orifices 80, 82 are well suited for controlling the characteristics of the gas exiting the gas chamber 54. Thus, the mass flow rate and flow characteristics of gas exiting the gas chamber 54 can be controlled by the outwardly positioned ejection orifices 80, 82.

While the implementation of the ejection orifices 80, 82 and retention orifices 84, 86 provides a high degree of control of gas exiting the gas chamber 54, the retention orifices 84, 86 may simply be a single section of the uniform cross-sectional area of the ejection orifices 80, 82. The use and variations of the retention orifices 84, 86 will be discussed later, including adjustment of the relative positions.

The orifices 70, 72 may be positioned within first and second inlet ports 62 to eject gas from the gas chamber 54 into a first volume 40 and a second volume 42. This type of attachment allows for the gas exiting the gas chamber 54 to directly enter the first and second volumes 40, 42. Hence, a gas guide or other type of conduit used to channel the inflation gas from the inflator 24 to the inflatable curtain 10 is not required. The inflator 24 may simply be clamped in gas-tight fashion within the first and second inlet ports 62, for example, through the use of ring-shaped clamps 64 that tightly press the fabric of the inlet ports 62 against the surface of the inflator 24.

The dual flow inflator 24 may be activated in a variety of ways to inflate the inflatable curtain 10. According to one embodiment, an initiator 100 may initiate production of a high pressure stream of gas ejecting from the inflator 24. The type of initiator 100 will depend upon the type of gas generant disposed in the inflators 24. For example, the gas generant may be a compressed gas, a liquid, or a solid that may be converted into a high pressure gas. Once the initiator 100 begins converting the gas generant into high pressure gas, the gas is forced out of the inflator 24. The ejection of the inflation gas from the inflator 24 is obtained by the relatively high pressure gas within the inflator 24 moving to the relatively low pressure ambient environment.

By controlling the flow dynamics and physical properties of the gas exiting the inflator 24, the present inflator 24 provides highly controllable gas ejecting attributes. This controllability provides the present inflator 24 with the ability to provide two selective and distinctive flows of gas into an inflatable curtain 10. In general, controlling the flow of gas exiting the inflator 24 is accomplished by controlling the mass flow rate of the exiting gas. Reviewing the variables that define the mass flow rate of a gas ejecting through an orifice provides an understanding of what characteristics of the inflator 24 may be varied to provide the desired control. The variables controlling the mass flow rate of a gas ejecting from an inflator 24 are established in the following equation:

$$\dot{m} = pVA$$

wherein:
$\dot{m}$=mass flow rate of the fluid
p=density of the fluid
V=velocity of the fluid
A=cross-sectional area of orifice The equation identifies three variables that control the mass flow rate of a gas: the orifice size, the velocity of fluid, and the fluid density. Because the gas is exiting the inflator 24 in a turbulent gas environment, the equation may not be completely linear. This is a result of variations in the fluid density and rapid changes in the fluid velocity. Furthermore, a compressible gas may also introduce inaccuracy into the equation. However, a highly compressed gas, such as is present in an inflator 24, will function in a manner similar to a liquid for the purposes of mass flow rate characterization.

While the equation provided above does not provide a completely accurate calculation of the mass flow rate exiting the inflator 24, it does illustrate how each of the variables affects the mass flow rate. As illustrated in the equation above, one manner of controlling the mass flow rate of a gas exiting the inflator 24 is to control the effective cross-sectional area of the orifice 70, 72 from which the gas is exiting. By maintaining the other variables at a generally constant value, the mass flow rate will increase or decrease in relation to the cross-sectional area of the orifice 70, 72. As the cross-sectional area of the orifice 70, 72 increases, the mass flow rate out of the orifice 70, 72 will correspondingly increase. Conversely, as the cross-sectional area of the orifice 70, 72 decreases, the mass flow rate out of the orifice 70, 72 decreases.

FIG. 2 illustrates a dual flow inflator 24 where the first ejection orifice 80 of the first end 66 and the second ejection orifice 82 of the second end 68 are different sizes. The inflator 24 has a first ejection orifice 80 that has a larger effective cross-sectional area than the second ejection orifice 82. The difference in the effective cross-sectional areas of the orifices 80, 82 is illustrated by the difference in the openings at the ends 66, 68 of the inflator 24. The effective cross-sectional area of an orifice 80, 82 may be defined as the area of the orifice 80, 82 that operates to allow ejection of gas.

In FIG. 2, the ejection orifices 80, 82 are both illustrated as cross-sectional views of circular openings in the inflator 24. Thus, the diameters of circular openings are depicted. Because the area of an opening is a function of its diameter, the first ejection orifice 80 will have a larger cross-sectional area than the second ejection orifice 82.

The inflator 24, having two differently sized orifices 80, 82 operates as the high pressure gas within the gas chamber 54 is produced. The high pressure gas is produced during an initiation sequence begun by the initiator 100. The initiator 100 causes the gas generant within the gas chamber 54 to be in a state where the gas may escape the inflator 24. This may entail converting the gas generant from a solid to a liquid, or entail opening sealing mechanisms in the gas chamber 54.

In one implementation, the sealing mechanism may be a plurality of burst disks 78 position within the retention orifices 84, 86. The burst disks 78 may be generally small and thin plates that block gas or the gas generant from escaping from the inflator 24. The burst disks 78 open the inflator 24 when the initiator 100 initiates. When the initiator 100 initiates, the shockwave of the initiator 100 discharging or the pressure of the gas created by the initiator 100, forces the burst disks 78 through the retention orifices 84, 86. The burst disks 78 are forced through the retention orifices 84, 86 by the pressure or shock wave causing the burst disks 78 to deflect. Once the orifices 70, 72 are open and the burst disks 78 are completely ejected through the orifices 70, 72, the burst disks 78 are captured by a screen 65.

Once the two ejection orifices 80, 82 are open, the high pressure gas within the gas chamber 54 will move to the relatively low pressure ambient environment through the ejection orifices 80, 82. In order for the gas to exit the inflator 24, the gas must pass through both orifices 70, 72. As described above, the first orifice 70 and the second orifice 72 may have two or more separate sections; an ejection orifice 80, 82, and a retention orifice 84, 86.

In the inflator 24 illustrated in FIG. 2, the ejection orifices 80, 82 have a smaller effective cross-sectional area than the retention orifices 84, 86. Because the most restrictive orifice through which a gas must pass will be the controlling orifice, the ejection orifices 80, 82 will control the mass flow rate in the inflator 24 illustrated. Thus, the effective cross-sectional areas of the ejection orifices 80, 82 will establish the individual mass flow rates.

By allowing the ejection orifices 80, 82 to control the mass flow rate of gas exiting the inflator 24, the first and second ejection orifices 80, 82 may be individually adjusted and sized to provide individual mass flow rates. As illustrated in FIG. 2 the first ejection orifice 80 is larger than the second ejection orifice 82. The varying sized inflator ejection orifices 80, 82 may be independently adjusted to establish two distinct mass flow rates ejecting from the inflator 24. Each of the ejection orifices 80, 82 will be sized to produce a selective mass flow rate.

For example, if a generally large mass flow rate is needed, a larger effective cross-sectional area will be established to create the desired flow rate. Alternatively, if a generally small mass flow rate is needed, then a smaller effective cross-sectional area will be established. The actual size of the cross-sectional area of the orifices 80, 82 may be established through computation or through experimentation. Furthermore, the mass flow rate required for each of the orifices 80, 82 may be determined by the size or the volumes 40, 42 of the curtains 10 that are being inflated.

The effective cross-sectional area of the ejection orifices 80, 82 can be controlled in many ways to establish the desired mass flow rate of gases exiting the inflator 24. The orifice 80, 82 may have any number of shapes to control the mass flow rate of gas exiting an inflator 24. Generally, any shape can be used to control the mass flow rate out of the inflator 24 by selecting a desired cross-sectional area of the ejection orifice 80, 82. Shapes such as rectangles, ovals, triangles, or various other shapes can be implemented to control the mass flow rates of gas ejecting out of an inflator 24. However, manufacturing concerns must be considered in selecting the orifice shape. Because of these concerns, circular shaped orifices may often be preferred.

The ejection orifices 80, 82 or other orifices 70, 72 are generally adjusted to the desired effective cross-sectional area during the manufacturing process. Thus, the independently adjusted orifices 70, 72, 80, 82, 84, 86 are adjusted during the manufacturing process based on previously determined mass flow rates. However, some variations of the present inflator 24 may include orifices 70, 72, 80, 82, 84, 86 that are capable of being adjusted after the inflator is manufactured. This maybe accomplished through the use of orifice inserts, protrusions, venting holes, or any other method of selectively controlling an effective cross-sectional area of an orifice 70, 72, 80, 82, 84, 86.

Figure 3:
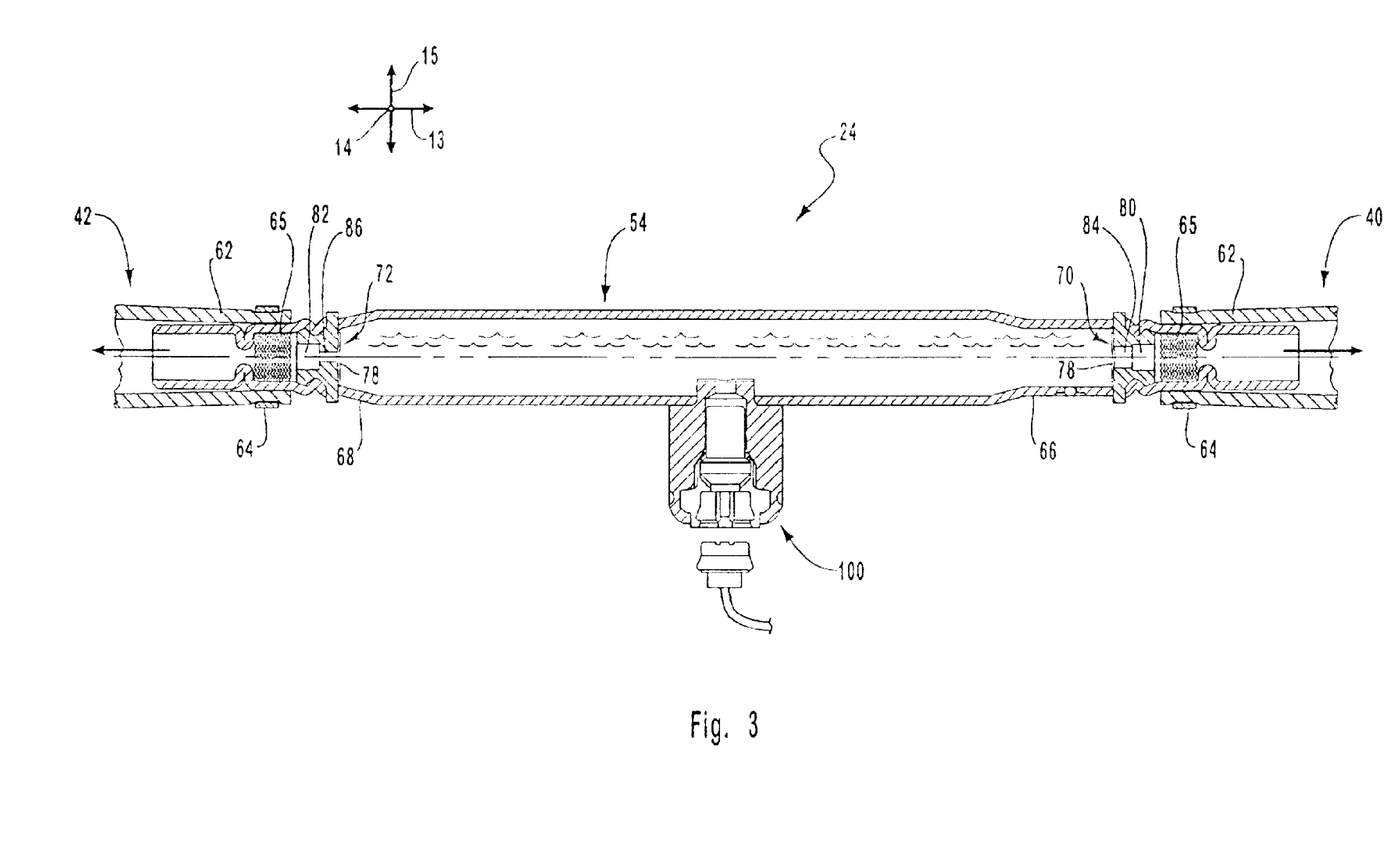
FIG. 3 is a cross-sectional view of an inflator having two different sized retention orifices.

Referring now to FIG. 3, the mass flow rate of gas ejecting from the inflator 24 may also be controlled at other locations along the inflator 24, besides at the ejection orifices 80, 82. The first retention orifice 84 and the second retention orifice 86 may also be used to establish the mass flow rate. The dual flow inflator 24 illustrated in FIG. 3 has a first retention orifice 84 and a second retention orifice 86 that are part of a system that seals the inflator 24. As discussed previously, the inflator 24 has an open state and a sealed state. FIG. 3 depicts the inflator 24 in the sealed state. In one application, the sealed state may be maintained through a number of burst disks 78 obstructing gas from exiting through the retention orifices 84, 86.

During initiation, the burst disks 78 or other sealing mechanisms are destroyed or forced away from their sealing positions. Once the inflator 24 is in the open state, gas may eject from the retention orifices 84, 86. Generally, the retention orifices 84, 86 are created to maintain the sealing mechanisms. In this capacity, it may be desirable for the first retention orifice 84 and the second retention orifice 86 to be similarly sized. For example, to simultaneously open two burst disks 78, it may be preferred for each burst disk 78 to span over a similarly sized retention orifice 84, 86, allowing for symmetry in opening characteristics of the two ends 66, 68.

However, as illustrated in FIG. 3, the retention orifices 84, 86 may be independently adjusted and sized to control the mass flow rate of gas exiting the inflator 24. For example, FIG. 3 illustrates the first retention orifice 84 as being larger than the second retention orifice 86. Thus, the first retention orifice 84 will provide a larger mass flow rate than the second retention orifice 86. The mass flow rate of gas ejecting from the first retention orifice 84 and the second retention orifice 86 may be controlled in the same manner as the first and second ejection orifices 80, 82.

However, because of the retention functions and the position of the retention orifices 84, 86 certain design considerations must be made to ensure proper function of the inflator 24. For example, gas exiting the first retention orifice 84 must subsequently pass through the first ejection orifice 80. Therefore, the size of the first ejection orifice 80 must be designed so as not to affect the mass flow rate of gas exiting the first retention orifice 84. Otherwise, if the first ejection orifice 80 has a smaller effective cross-sectional area than the first retention orifice 84, then the cross-sectional area of the first ejection orifice 80 will control the overall mass flow rate. To avoid having conflicting mass flow rate mechanisms, the ejection orifices 80, 82 should generally have a larger effective cross-sectional area than the retention orifices 84, 86. If the ejection orifices 80, 82 are larger than the retention orifices 84, 86, then the mass flow rate will be controlled by the smaller retention orifices 84, 86.

Alternatively, the ejection orifices 80, 82 and the retention orifices 84, 86 may comprise a single orifice 70, 72 having a single effective cross-sectional area. Such an orifice 70, 72 design would operate similarly to the orifices 80, 82, 84, 86 described above. However, no distinction would be made between the ejection orifices 80, 82 and the retention orifices 84, 86.

Another consideration when adjusting the mass flow rate through use of the retention orifices 84, 86 is the operation of the burst disks 78. The burst disks 78 are designed to be forced through the retention orifices 84, 86 at a determined pressure or in response to a predetermined shock wave. As the size of the retention orifices 84, 86 change, the design of the burst disks 78 must also be changed to maintain a selective opening time, if so desired. This may require that the structure of the burst disks 78 be modified to maintain a desired opening time. A weaker burst disk 78 would span over a smaller retention orifice 84, 86, such as the second retention orifice 86, and a comparatively stronger burst disk 78 would span over the larger retention orifice 84. Such calculations could be made with common fixed-fixed beam or thin plate deflection equations.

Beyond the use of selectively sized orifices 70, 72, 80, 82, 84, 86 to control the mass flow rate of gas exiting the inflator 24, other mechanisms may be employed. FIGS. 4A, 4B and FIGS. 5A, 5B illustrate another mechanism for controlling the mass flow rate of gas exiting an inflator 24.

Figure 4A:
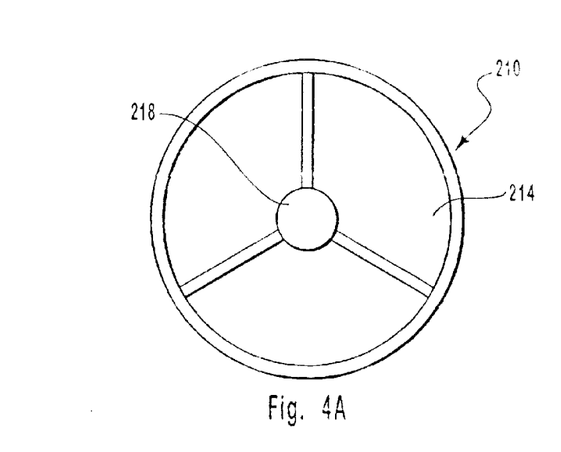
FIG. 4A is an end view of an obstructed orifice embodiment having a first effective cross-sectional area.
Figure 4B:
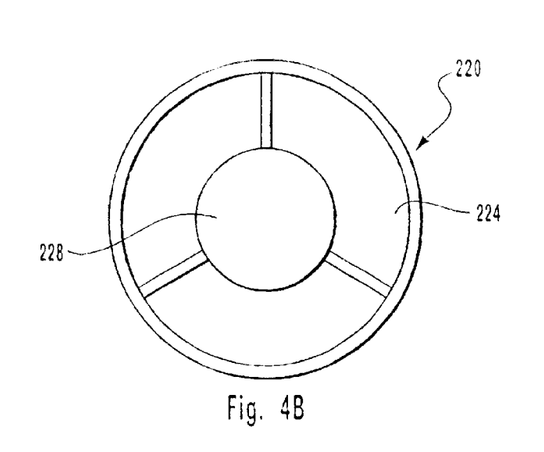
FIG. 4B is an end view of an obstructed orifice embodiment having a second effective cross-sectional area.

Referring now to FIGS. 4A & 4B, two ejection orifices 210, 220 are illustrated having two different effective cross-sectional areas 214, 224 controlled through varying sized obstructions 218, 228 placed in the orifices 210, 220. As can be seen in FIG. 4A, the first obstruction 218 is smaller than the second obstruction 228 in FIG. 4B, while the overall diameter of the orifices 210, 220 are similar. The smaller obstruction 218 allows a larger effective cross-sectional area 214 for the first orifice 210, i.e. a larger area for gas to pass through. Conversely, the second orifice 220, having the larger obstruction 228, will have a lower mass flow rate.

The obstructions 218, 228 would not require different orifice 210, 220 diameters between the first end 66 and the second end 68 of an inflator 24 to control the mass flow rates. Rather, a single orifice 210, 220 diameter may be used at both ends of the inflator 24. Then, the differing sized obstructions 218, 228 may be placed in the path of the ejecting gas to limit the mass flow rates without changing the diameters of the orifices 210, 220. The different sized obstructions 218, 228 in opposing ends will function similarly to different sized orifices 70, 72.

Figure 5A:
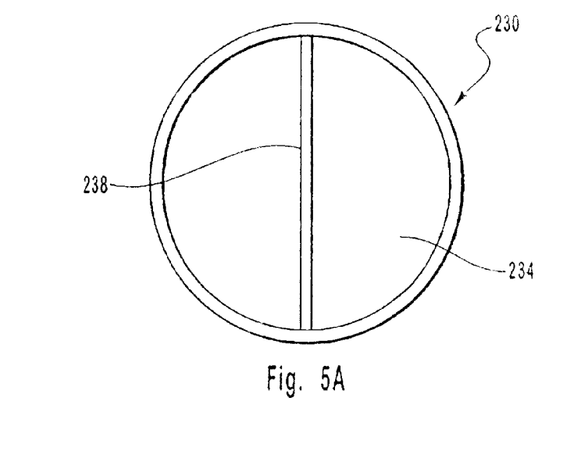
FIG. 5A is an end view of another obstructed orifice embodiment implementing a pin obstruction and having a first effective cross-sectional area.
Figure 5B:
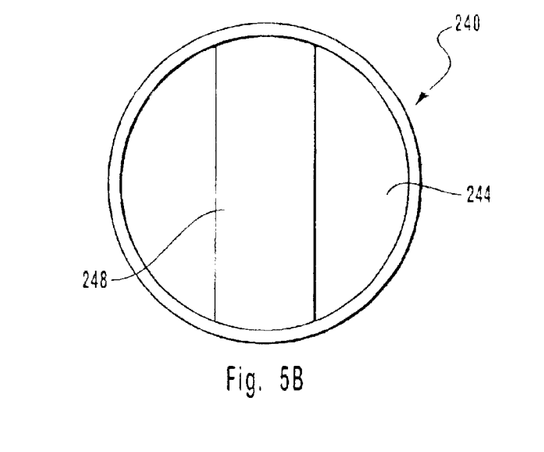
FIG. 5B is an end view of another obstructed orifice embodiment implementing a pin obstruction and having a second effective cross-sectional area.

FIGS. 4A & 4B illustrates the obstructions 218, 228 as being circular shaped sections generally located within the center of the orifices 210, 220. However, other shapes and types of obstructions are also possible. FIGS. 5A & 5B illustrates an alternative embodiment of an obstruction 238, 248 positioned within an orifice 230, 240. The obstructions 238, 248 illustrated in FIGS. 5A & 5B differ from the obstructions 218,228 illustrated in FIGS. 4A & 4B by their shape and potential modular nature. The obstructions 238, 248 of FIGS. 5A & 5B are pins rather than circular shaped members.

The pin obstructions 238, 248 may have some advantages over the circular shaped obstructions for manufacturing purposes. The pin obstructions 238,248 may be added to the orifices 230, 240 simply by placing the pins 238, 248 through holes located adjacent to the orifices 230, 240. This would allow the mass flow rates of the two orifices 230, 240 to be independently adjusted after the inflator 24 body is manufactured. However, variations of the obstructions 218, 228 illustrated in FIGS. 4A & 4B may also provide for varying the effective cross-sectional areas 214, 224 in a post manufacturing situation.

Another variation that may be applied to the obstruction embodiment is to make the obstructions 218, 228, 238, 248 adjustable. For example, the pin obstructions 238, 248 may be a threaded mechanism that can be selectively adjusted into and out of the orifices 230, 240. Thus, only a portion of the pin obstruction 238, 248 would extend into the orifice 230, 240. Furthermore, other designs and mechanisms of adjusting the circular obstructions 218, 228 illustrated in FIG. 4A & B may be employed to adjust the size of the obstructions 218, 228.

Figure 6:
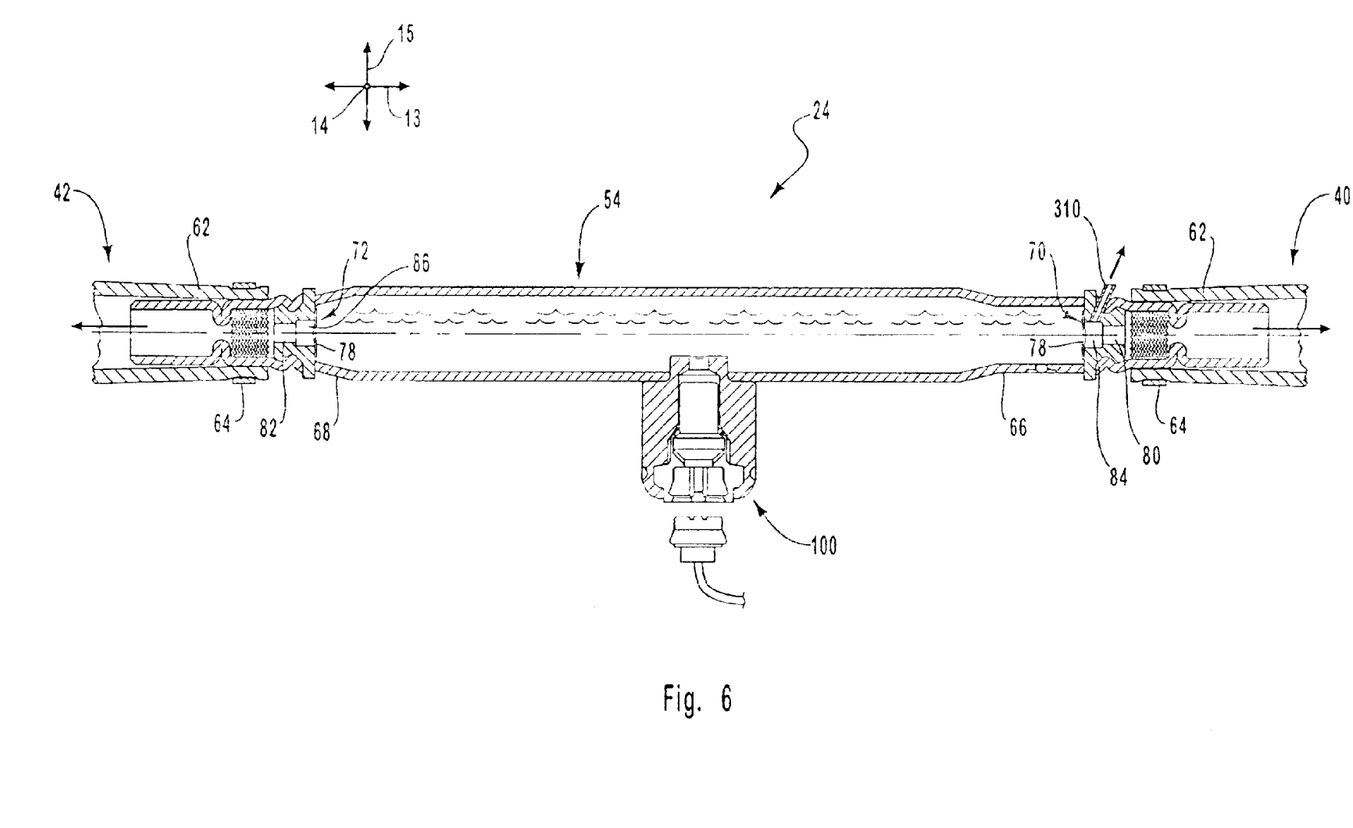
FIG. 6 is a cross-sectional view of an inflator having a bleed line.

Referring now to FIG. 6, another mechanism for controlling the mass flow rate of an inflator 24 is illustrated. The inflator 24 may be configured with a venting hole or bleed line 310 for ejecting an amount of gas out of the inflator 24 but not into the inflatable curtain. A bleed line 310 is simply an additional orifice from which gas may be ejected. However the gas would not be ejected into the inflatable curtain 10. Instead, the gas would be vented to another location at a point before the ejection orifices 80, 82.

Because the bleed line 310 would divert a mass flow of gas away from the inflatable curtain 10, the diverted mass of gas would be subtracted from the mass flow of gas originally ejected toward the specific inflator end 66, 68. Thus, a bleed line 310 placed at the first end 66 of the inflator 24 would cause the mass flow rate of gas ejecting from the first end 66 to be less than the mass flow rate of gas ejecting from the second end 68. The effect would be similar to having two different orifice sizes 70, 72 on each of the ends 66, 68.

The size of the bleed line 310 could be sized, similar to the ejection orifices 80, 82, to eject a controlled amount of gas out of the inflator 24. The amount of gas could be precisely calculated to provide varying mass flow rates out of each of the ends 66, 68 of the inflator 24. Furthermore, a bleed line 310 may be located in one or more of the ends 66, 68 of the inflator 24. Where each bleed line 310 ejects a controlled amount of gas. Additionally, more than one bleed line 310 may be present in each end 66, 68 of the inflator 24.

Figure 7:
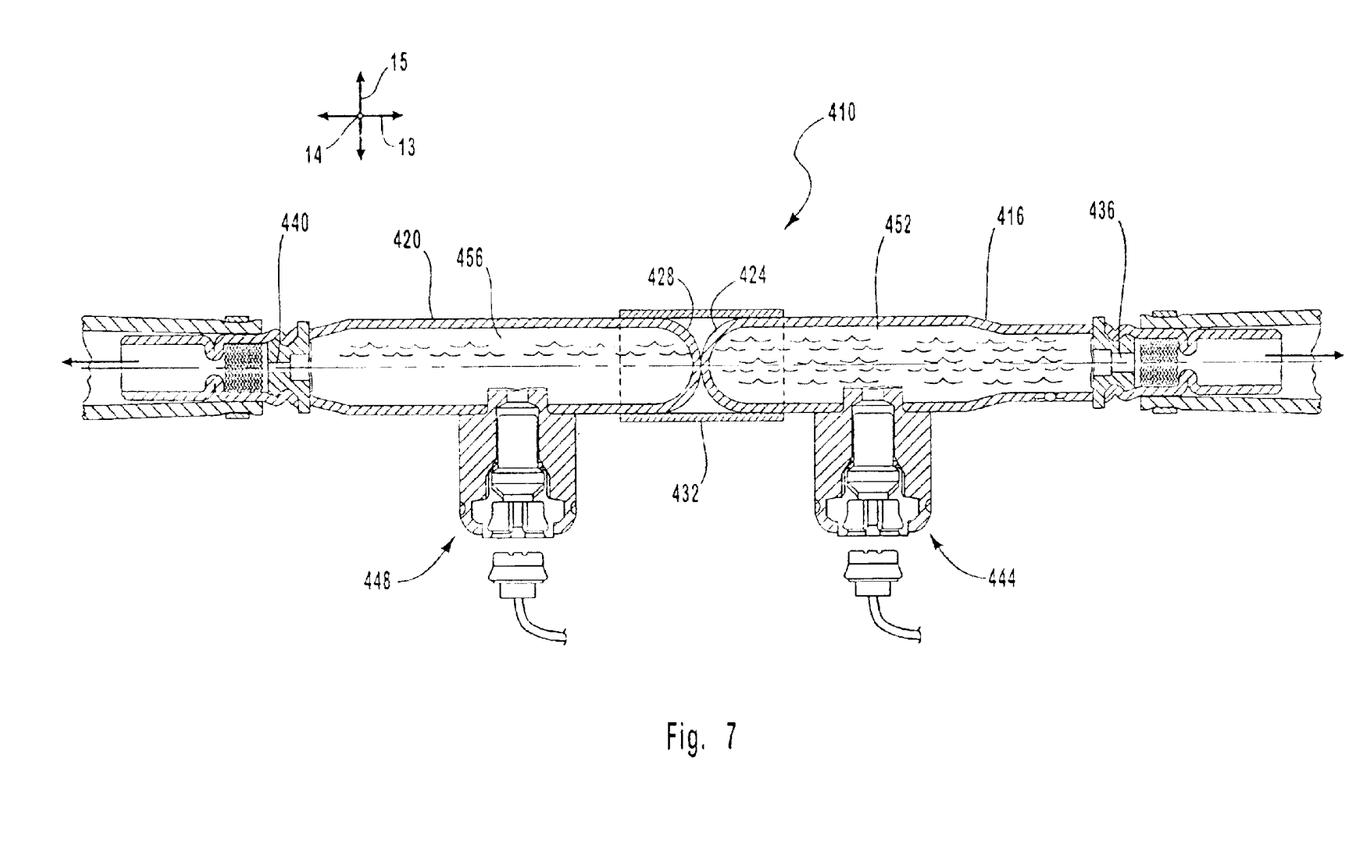
FIG. 7 is a cross-sectional view of a dual-inflator inflator module.

A further mechanism for controlling the mass flow rate of a gas exiting an inflator 24 is an inflator module 410 comprised of a first inflator 416 and a second inflator 420 as illustrated in FIG. 7. The first inflator 416 and the second inflator 420 may be connected at their bases 424, 428 by a coupling member 432. The coupling member 432 maintains the relative position of the two inflators 416, 420, such that gas ejecting from the first inflator 416 and gas ejecting from the second inflator 420 eject in substantially opposite directions.

In the module 410 illustrated in FIG. 7, the first inflator 416 and the second inflator 420 may be configured to eject gas at two different mass flow rates. In one implementation, the two inflators 416, 420 may have differently sized orifices 436, 440, as illustrated in FIG. 7. This configuration would function similarly to the inflator 24 illustrated in FIG. 2. This is represented by the difference in the cross-sectional areas of the openings at the two orifices 436, 440. By coupling the two inflators 416, 420 together, the two inflators 416, 420 may operate as a single inflator 24 having two differently sized orifices 436, 440 for ejecting a gas.

In the inflator module 410 of FIG. 7, both of the inflators 416, 420 have an individual initiator 444, 448 to induce an open configuration. The initiators 444, 448 can be configured to simultaneously initiate both inflators 416, 420 or may alternatively initiate the inflators 416, 420 at different times. Variations of the inflator module 410 may have the two inflators 416, 420 sharing a common initiator. This would reduce the part count and thus reduce the cost of the inflator module 410. However, this may also increase the manufacturing cost associated with inserting a single initiator into two inflators 416, 420.

Another implementation of the inflator module 410 illustrated in FIG. 7, involves the use of different gas generants or gas generant quantities in each of the inflators 416, 420. The first inflator 416 is illustrated as having a higher density of gas generant 452 than the second inflator 420. In context of the equation previously cited, this would be equivalent to changing the density of the gas within a single inflator 24. Thus, a different mass flow rate could be achieved through two inflators 416, 420 each having a similarly sized ejection orifice 436, 440.

For example, the first inflator 416 could eject a higher mass flow rate of gas than could the second inflator 420. This could be caused because by the higher density of gas generant 452 in the first inflator 416 compared to the gas generant 456 in the second inflator 420. Alternatively, the use of different gas generant densities 452, 456 could be combined with differing sized ejection orifices 436, 440. Such a configuration could provide for a large range of controllability of two separate mass flow rates of gas out of the inflator module 410.

Other similar types of inflator designs may simply divide an inflator into two different chambers, where each of the chambers is configured to eject a different mass flow rate of gas. The chambers could incorporate varying amounts and different types of gases to control the mass flow rate. The inflator may also be any number of shapes. The inflators previously illustrated have been generally elongated. However, the inflators can be any shape that allows for two individually adjustable mass flow rates to eject from the inflator and into an inflatable curtain.

Because the inflators previously discussed provide different mass flow rates of gas between the two opposing ends, the inflator is not completely thrust neutral. For example, in the inflator 24 of FIG. 2 the first ejection orifice 80 is larger than the second ejection orifice 82. The difference in the sizes of the orifices 80, 82 produces two different mass flow rates which in turn produce two different thrusts. Because the mass flow rate of gas ejecting from the first ejection orifice 80 is larger than the mass flow rate of gas ejecting from the second orifice 82, the inflator 24 will have a positive thrust in a negative longitudinal direction 13.

However, because the thrust from the first orifice 80 and the thrust from the second orifice 82 are in substantially opposite directions, they may substantially cancel each other out. For example, a thrust from the first orifice 80 will be in a negative longitudinal direction 13 and a thrust from the second orifice 82 will be in a positive longitudinal direction 13. These substantially opposite thrust directions will tend to cancel each other out, to the extent that they are equal. Thus, the thrust of the inflator 24 will be equal to the thrust produced by the first orifice 80 subtracted by the thrust produced by the second orifice 82.

Figure 8:
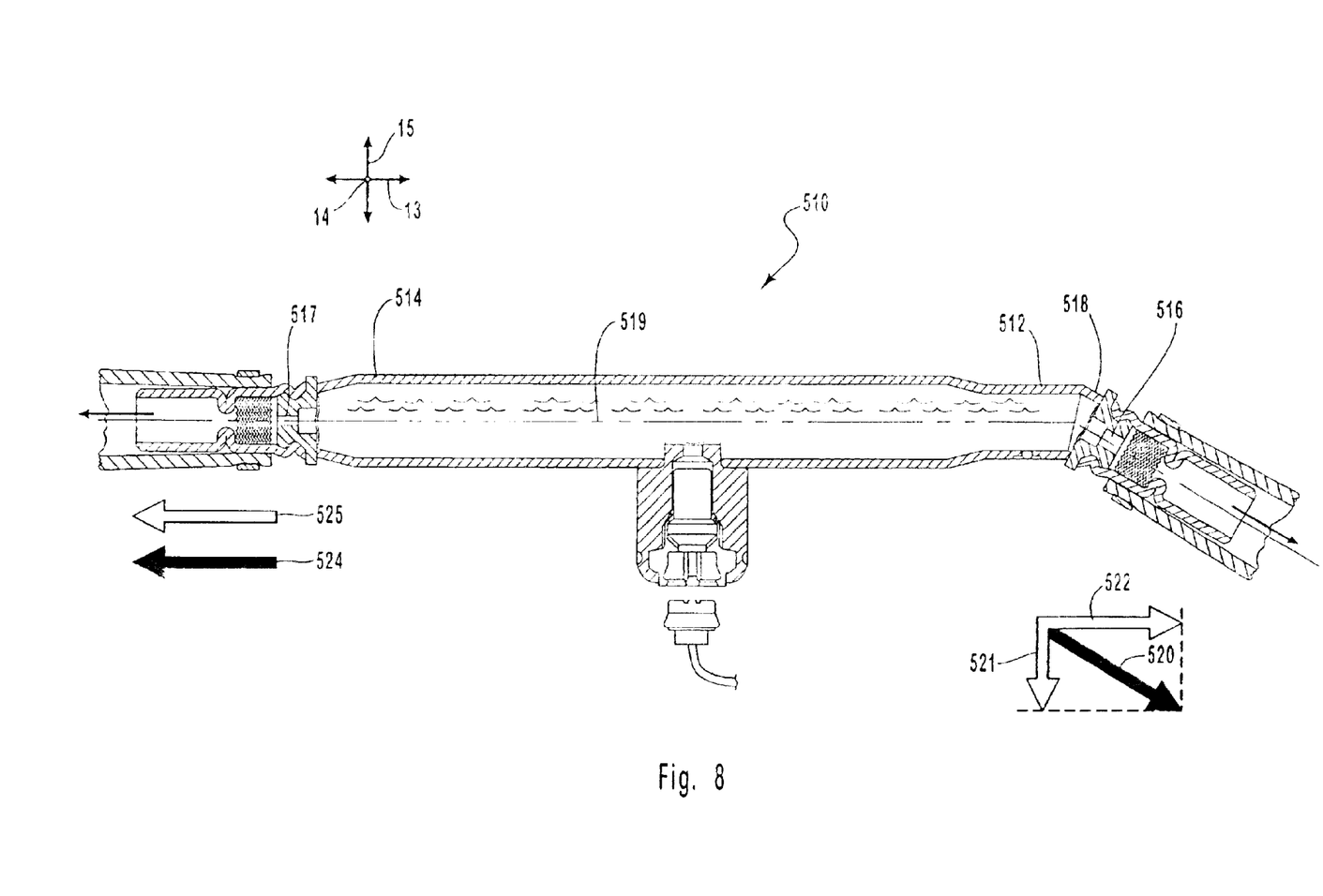
FIG. 8 is a cross-sectional view of an inflator having an angled end.

While the thrust may be substantially reduced, it may be desired in some instances for the inflator 24 to be entirely thrust neutral in a single direction. FIG. 8 illustrates an inflator 510 capable of being thrust neutral along a single axis. The thrust neutral configuration is maintained in a single direction at the expense of thrust into an opposite direction, as will be illustrated below.

Referring now to FIG. 8, the inflator 510 has a first end 512 and a second end 514. The first end 512 and the second end 514 are configured to eject a flow of gas out of the first orifice 516 and the second orifice 517 respectively. In the inflator 510 illustrated, the first orifice 516 is larger than the second orifice 517, such that the first orifice 516 ejects gas at a higher mass flow rate than the second orifice 517. Thus, the larger mass flow rate of gas ejecting from the first orifice 516 will produce a larger thrust at the first end 512 than the thrust produced by the second orifice 517 at the second end 514.

To compensate for the thrust differential, the first end 512 has an angled section 518, where the first end 512 and the second and 514 do not share a common axis 519. The angled section 518 of the first end 512 produces a thrust 520 that is not in the same axis 519 as a thrust 524 produced at the second end 514. The gas ejected from the first end 512 produces a first thrust 520, where the first thrust 520 has a longitudinal component 522 and a transverse component 521. The gas ejected from the second end 514 produces a thrust 524 with only a longitudinal component 525.

The angled section 518 will establish the longitudinal component 522 and the transverse component 521 of the first thrust 520. By selectively controlling the angle of the angled section 518, the longitudinal component 522 of the first thrust 520 can be made equal to the entire longitudinal component 525 of the second thrust 524. Because the longitudinal component 522 of the first thrust 520 is in a substantially opposite direction than the longitudinal component 525 of the second thrust 524, the inflator 510 will be thrust neutral along the axis 519.

While the inflator 510 will not be thrust neutral in the transverse direction 15, the shape and mounting of the inflator 510 generally may make the transverse thrust of little consequence. For example, some attachment mechanisms that attach the inflator 510 to the structure of the automobile 12 may be susceptible to disengaging the inflator 510 in the presence of a net longitudinal 13 thrust. However, the implementation of an angled section 518 in the inflator 510 can eliminate substantially all thrust in the longitudinal direction 13. Thus, only a transverse component 521 of the first thrust 520 will remain. Because the biaxial flow inflator 510 is generally mounted along the roof rail of an automobile 12, the transverse thrust component 521 will force the inflator 510 against the automobile's 12 structure. Such an inflator 510 implementing an angled section 518 may have various applications in controlling the gas flow and thrust of gas ejecting from the inflator 510.

Figure 9:
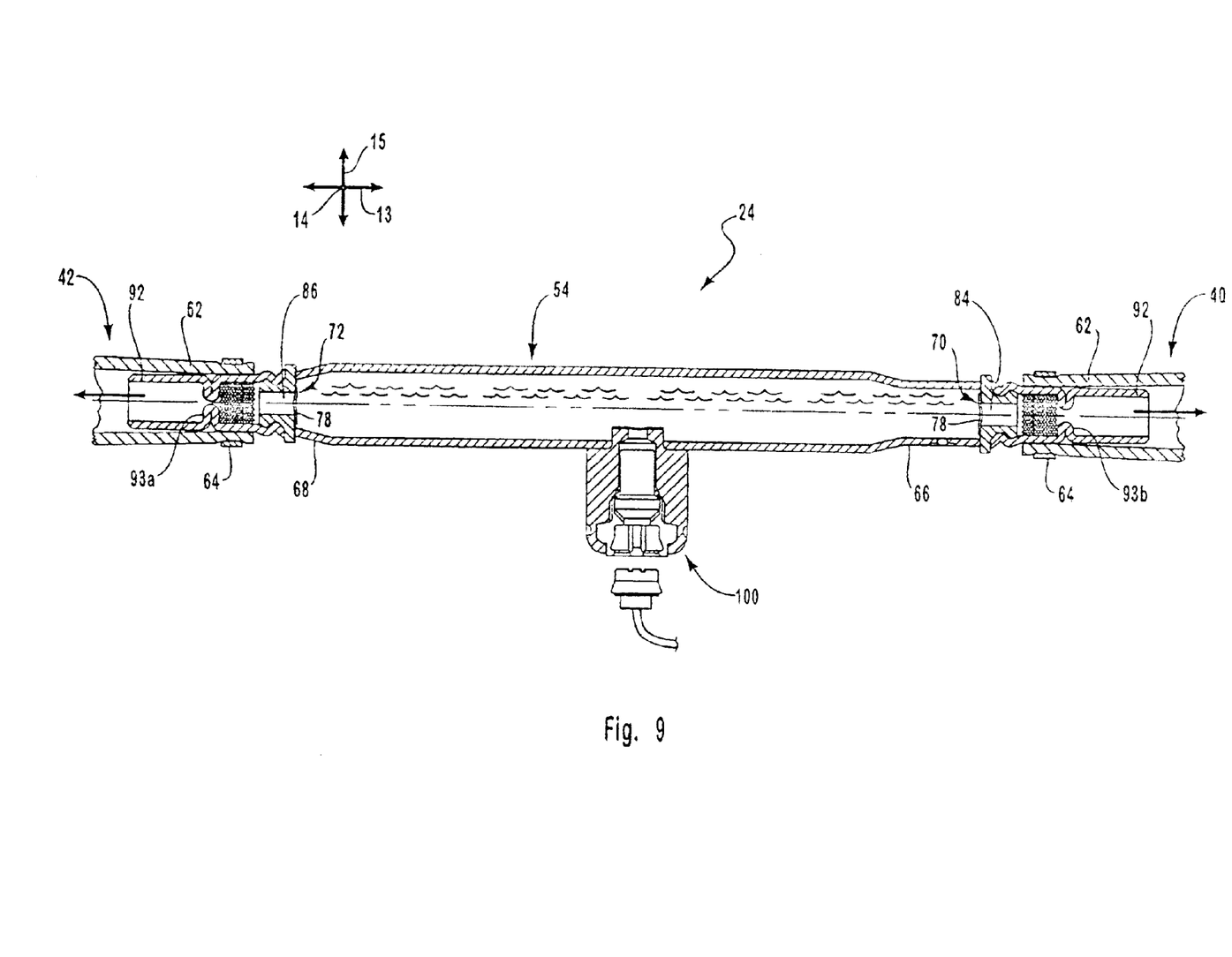
FIG. 9 is a cross-sectional view of an inflator having two different sized choked orifices.

Referring now to FIG. 9, an alternative embodiment of the inflator 24 is illustrated where the flow rate of gas ejecting from the inflator 24 is controlled by choking orifices 93a, 93b. In the inflator 24 illustrated, the retention orifices 84, 86 are substantially the same size to emit an equal mass flow rate from each orifice 84, 86. The retention orifices 84, 86 may provide a channel having a generally uniform cross-section from the interior of the inflator 24.

In this embodiment, the flow rate of gas exiting the inflator 24 is controlled by the choking orifices 93a, 93b positioned laterally outward from the retention orifices 84, 86. As illustrated, the first choking orifice 93a may have a smaller opening than the second choking orifice 93b. Thus, the flow rate of gas ejecting from the inflator may be controlled by the choking orifices 93a, 93b, such that the gas ejecting from the first choking orifice 93a has a smaller mass flow rate than the gas ejecting from the second choking orifice 93b.

As was previously noted, in order for the choking orifices 93a, 93b to control the mass flow rate of gas ejecting from the inflator 24, the retention orifices 84, 86 must be larger than the choking orifices 93a, 93b. Furthermore, the choking orifices 93a, 93b need not necessarily be a necked-down section in the end 92 of the inflator 24. The choking orifices 93a, 93b may be crimped ends of the inflator where the gas exiting the choking orifices 93a, 93b directly enters the airbag.

Figure 10:
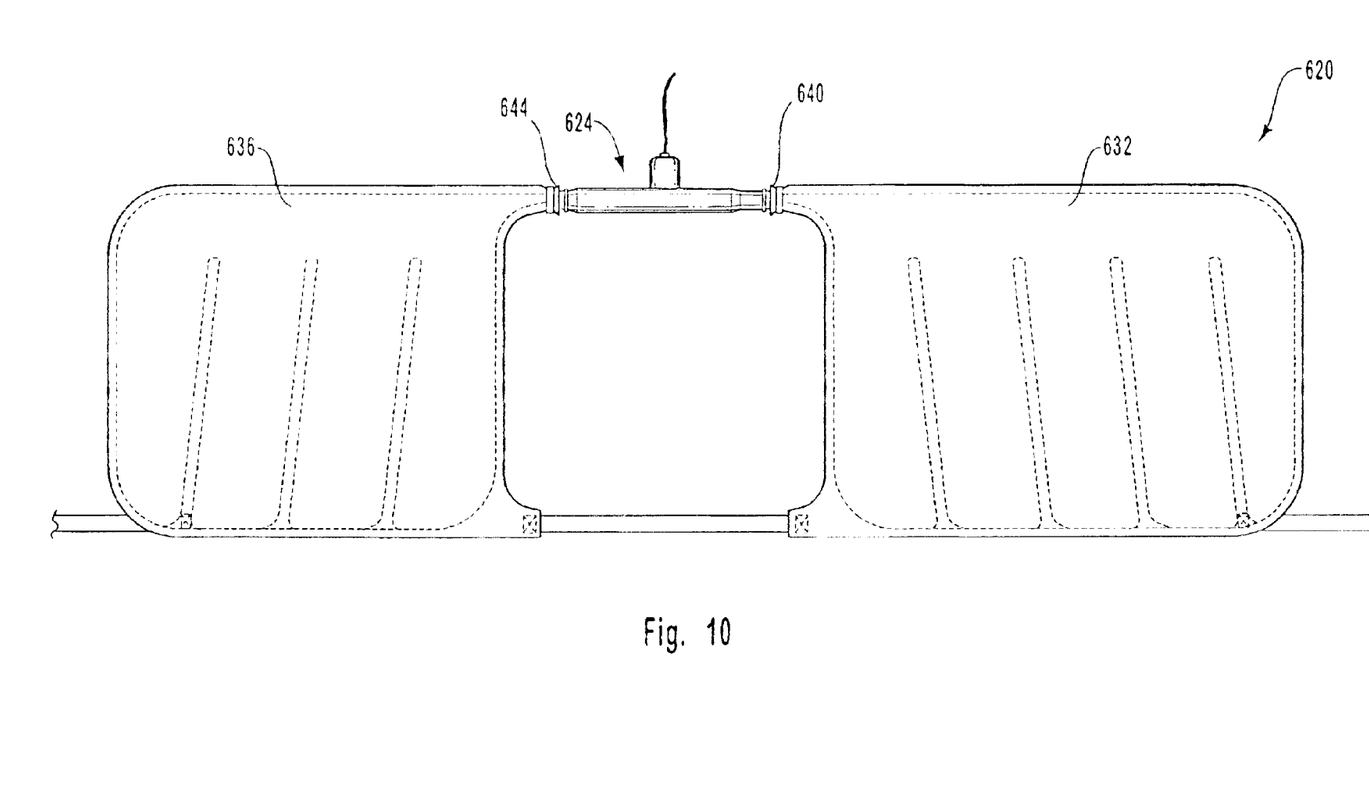
FIG. 10 is a side view of an inflator and an inflatable curtain.

Implementing inflators having independently adjustable mass flow rates allows a single inflator design to be applied to a large number of inflatable curtain designs and configurations. Furthermore, the independently adjustable orifices provide a large range of control for the deployment characteristics of singular or multiple inflatable curtains. Referring now to FIG. 10, an inflatable curtain 620 coupled to a biaxial inflator 624 is illustrated. The inflatable curtain 620 has a first volume 632 and a second volume 636 that are not equally sized, where the first volume 632 is larger than the second volume 636.

In order to simultaneously and instantaneously fill both inflatable curtain volumes 632, 636, the mass flow rate of gas ejecting from the first end 640 of the inflator 624 should be larger than the mass flow rate of gas ejecting from the second end 644. The difference in mass flow rates can be selected according to the different sizes of inflatable curtain volumes 632, 636. This may be accomplished through any of the above discussed mechanisms, such as an inflator 624 having two differently sized ejection orifices. Thus, the size of the orifices could be sized to the inflatable curtain 620 volumes 632, 636.

The independently adjustable inflator 624 can be implemented in different inflatable curtain 620 configurations. For example, the first volume 632 and second volume 636 of the inflatable curtain 620 may be configured such that gas cannot flow between the two volumes 632, 636. In other embodiments, the first volume 632 and the second volume 636 may be in fluid communication, allowing gas to flow from one volume 632 to the other 636. By adjusting the mass flow rate for either design, the inflation characteristics of the inflatable curtain 620 may be controlled.

Other inflatable curtain 620 designs may not have two separate volumes 632, 636, but rather would have a single rectangular shaped volume fed by both ends of the inflator 624. The independently adjustable inflator 624 could be used when the inflator 624 is not in the center of the rectangular shaped inflatable curtain 620. The mass flow rates could be designed to eject an amount of gas that corresponds to the size of the sections of the inflatable curtain 620 that the inflator 624 must fill. While an inflator 624 with a non-adjusted mass flow rate could still fill a large rectangular shaped inflatable curtain 620, the adjustable mass flow rates allow for both sections to be inflated simultaneously, even if differences in the size of the sections is large.

Another application of the independently adjustable mass flow rates is the ability to control deployment sequences of multiple inflatable curtains 620 or multiple sections of a single curtain 620. For example, the inflatable curtain 620 of FIG. 10 has two separate volumes 632, 636. In some deployment conditions it may be desirable for one of the volumes 632 to be inflated before the other 636. By varying the mass flow rates of the gas ejecting into each volume 632, 636, the first volume 632 can be made to inflate before the second volume 636. The mass flow rates of the ends 640, 644 of the inflator 624 can be used with any number of differently sized volumes 632, 636. Furthermore, the inflator 624 can also inflate one side of a single inflatable curtain 620 before the other, or have a larger instantaneous pressure than the other side.

The inflator described above can have a number of embodiments by varying the shape, orientation, sequence, positioning, or other variables of the inflator. The inflator can be broadly described as an inflator configured to eject a gas at a first mass flow rate from a first orifice and eject a gas at a second mass flow rate from a second orifice. By varying the mass flow rates the inflator can controllably inflate a wide range of inflatable curtain designs.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An inflator for a vehicular airbag system, the inflator comprising:
   a gas chamber having an open state and a sealed state;
   a first orifice fluidly coupled to the gas chamber such that gas is able to flow along a substantially straight path to reach the first orifice from the gas chamber, wherein the first orifice has a first effective cross-sectional area;
   a second orifice fluidly coupled to the gas chamber, wherein the second orifice has a second effective cross-sectional area, and wherein the first effective cross-sectional area is different from the second effective cross-sectional area, wherein the gas chamber is disposed between the first orifice and the second orifice.

2. The inflator, as recited in claim 1, wherein the first orifice is coupled to a first volume and the second orifice is coupled to a second volume.

3. The inflator, as recited in claim 2, further comprising a gas generant disposed within the gas chamber.

4. The inflator, as recited in claim 3, wherein the gas generant is selected from the group consisting of a compressed gas, a solid, and a liquid.

5. The inflator, as recited in claim 3, wherein in the open state the gas generant provides an inflationary gas flow into the first volume and the second volume.

6. The inflator, as recited in claim 3, wherein the first volume and the second volume are different sizes.

7. The inflator, as recited in claim 6, wherein during an initiation sequence of the inflator, the first volume and the second volume inflate substantially simultaneously.

8. The inflator, as recited in claim 3, wherein the first volume and the second volume are separate inflatable curtains.

9. The inflator, as recited in claim 3, wherein the first volume and the second volume are separate sections of a single inflatable curtain.

10. The inflator, as recited in claim 9, wherein the first volume and the second volume are in fluid communication.

11. The inflator as recited in claim 2, wherein the gas chamber has a longitudinal axis.

12. The inflator, as recited in claim 11, wherein the gas chamber is generally elongated.

13. The inflator, as recited in claim 11, wherein the first orifice is positioned to eject gas in a first direction along the longitudinal axis and the second orifice is positioned to eject gas in a second direction along the longitudinal axis, wherein the first direction is substantially opposite the second direction.

14. The inflator, as recited in claim 11, wherein the first orifice is positioned to eject gas in a first direction along the longitudinal axis and the second orifice is positioned to eject gas in a second direction at an angle offset from the longitudinal axis.

15. The inflator, as recited in claim 14, wherein in the open state a thrust component along the first direction is partially counteracted by a thrust component along the second direction.

16. The inflator, as recited in claim 1, further comprising an obstruction selectively located in the first orifice to establish the first effective cross-sectional area.

17. The inflator, as recited in claim 1, wherein the inflator has a first end and a second end, wherein the first orifice is located in the first end and the second orifice is located in the second end.

18. The inflator, as recited in claim 17, wherein the first end is angled relative to the second end, such that the inflator is substantially thrust neutral along a single axis.

19. An inflator for a vehicular airbag system, the inflator comprising:
   a gas supply;
   a first orifice fluidly coupled to the gas supply such that gas is able to flow along a substantially straight path to reach the first orifice from the gas supply;
   a second orifice fluidly coupled to the gas supply; and
   at least one initiator coupled to the gas supply, wherein the at least one initiator is configured to initiate delivery of gas at a pressure above ambient within the gas supply at an initiation moment, such that after the initiation moment the first orifice ejects gas at a first mass flow rate and the second orifice ejects gas at a second mass flow rate, wherein the first mass flow rate is different than the second mass flow rate, wherein the gas supply is disposed between the first orifice and the second orifice.

20. The inflator, as recited in claim 19, further comprising a venting orifice positioned to divert an amount of the gas away from one of the first orifice and the second orifice.

21. The inflator, as recited in claim 19, further comprising at least one obstruction selectively located in one of the first orifice and second orifice.

22. The inflator, as recited in claim 21, wherein a first obstruction establishes a first effective cross-sectional area of the first orifice and a second obstruction establishes a second effective cross-sectional area of the second orifice.

23. The inflator, as recited in claim 21, wherein the obstruction is a pin selectively positioned within one of the first orifice and the second orifice.

24. The inflator, as recited in claim 21, wherein the obstruction is a generally circular member selectively positioned within one of the first orifice and the second orifice.

25. The inflator, as recited in claim 19, wherein the inflator is coupled to an inflatable curtain, wherein the inflatable curtain has a first volume and a second volume.

26. The inflator, as recited in claim 25, wherein the first mass flow rate is sufficient to inflate the first volume of the inflatable curtain and the second mass flow rate is sufficient to inflate the second volume of the inflatable curtain.

27. The inflator, as recited in claim 26, wherein the first volume and second volume are different sizes.

28. The inflator, as recited in claim 19, wherein the gas supply has a first chamber and a second chamber.

29. The inflator, as recited in claim 28, wherein at the initiation moment gas from the first chamber ejects from the first orifice and gas from the second chamber ejects from the second orifice.

30. The inflator, as recited in claim 29, wherein a gas generant in the first chamber has a different composition than a gas generant in the second chamber.

* * * * *